United States Patent
Lin et al.

(10) Patent No.: US 11,799,962 B1
(45) Date of Patent: Oct. 24, 2023

(54) METHOD, ELECTRONIC DEVICE, AND COMPUTER PROGRAM PRODUCT FOR LOOKING UP DATA

(71) Applicant: Dell Products L.P., Round Rock, TX (US)

(72) Inventors: Zhenzhen Lin, Shanghai (CN); Si Chen, Shanghai (CN); Anzhou Hou, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 17/747,677

(22) Filed: May 18, 2022

(30) Foreign Application Priority Data

Apr. 22, 2022 (CN) .......................... 202210430392.X (51) Int. Cl.
*H04L 67/1097* (2022.01)
*G06F 3/06* (2006.01)

(52) U.S. Cl.
CPC .......... *H04L 67/1097* (2013.01); *G06F 3/067* (2013.01); *G06F 3/0617* (2013.01); *G06F 3/0655* (2013.01)

(58) Field of Classification Search
CPC . H04L 67/1097; G06F 3/0617; G06F 3/0655; G06F 3/067
See application file for complete search history.

(56) References Cited

U.S. PATENT DOCUMENTS

| 7,818,402 | B1 | 10/2010 | Zhang |
| 8,256,010 | B2 * | 8/2012 | Orlov .................... H04L 9/0836 380/278 |
| 11,005,703 | B1 | 5/2021 | Wu et al. |
| 2012/0136962 | A1 * | 5/2012 | Gardner .............. H04L 67/1095 709/217 |
| 2016/0301751 | A1 | 10/2016 | Peelen et al. |
| 2017/0272100 | A1 | 9/2017 | Yanovsky et al. |
| 2019/0163372 | A1 | 5/2019 | Sridharan |
| 2020/0012619 | A1 | 1/2020 | Gupta et al. |
| 2020/0036789 | A1 | 1/2020 | Mehta et al. |
| 2020/0301883 | A1 | 9/2020 | Kamiya et al. |

(Continued)

OTHER PUBLICATIONS

P. Maymounkov et al., "Kademlia: A Peer-to-Peer Information System Based on the XOR Metric," First International Workshop on Peer-to-Peer Systems (IPTPS), Mar. 7-8, 2002, 6 pages.

*Primary Examiner* — Chris Parry
*Assistant Examiner* — Steven C Nguyen
(74) *Attorney, Agent, or Firm* — Ryan, Mason & Lewis, LLP (57) ABSTRACT

Embodiments of the present disclosure relate to a method, an electronic device, and a computer program product for looking up data. This method includes: acquiring, at a first node, a data identifier for data to be looked up, wherein the first node is located in a system having a layered structure, and the data identifier comprises layer information related to a layer in the layered structure. The method further includes: determining a distance between the data identifier and a node identifier for the first node. The method further includes: determining, based on the distance, a second node that can be used to acquire metadata for the data for acquiring the metadata, wherein the distance is related to positions of the first node and the second node in the layered structure. The method further includes: determining, based on the metadata, a third node storing the data for acquiring the data.

16 Claims, 6 Drawing Sheets

(56) References Cited

U.S. PATENT DOCUMENTS

| | | |
|---|---|---|
| 2021/0126970 A1 | 4/2021 | Zhang et al. |
| 2021/0168207 A1 | 6/2021 | Lin et al. |
| 2021/0289038 A1* | 9/2021 | Mikityuk ................ G06F 9/465 |
| 2022/0292068 A1* | 9/2022 | Lin ....................... G06F 16/322 |

* cited by examiner

METHOD, ELECTRONIC DEVICE, AND COMPUTER PROGRAM PRODUCT FOR LOOKING UP DATA

RELATED APPLICATION(S)

The present application claims priority to Chinese Patent Application No. 202210430392.X, filed Apr. 22, 2022, and entitled "Method, Electronic Device, and Computer Program Product for Looking Up Data," which is incorporated by reference herein in its entirety.

FIELD

Embodiments of the present disclosure generally relate to the field of data processing, and in particular, to a method, an electronic device, and a computer program product for looking up data.

BACKGROUND

Currently, more and more clouds, edge nodes, and a large number of clients participate, in the form of nodes, in 5G networks and edge storage and computing. Various types of nodes are connected together to form a distributed storage system (also known as a distributed storage network) for providing high throughput and high availability of data to users.

Distributed storage systems based on edge storage and organized according to a decentralized approach have been proposed. Due to the increasing number of participating nodes, mechanisms such as distributed hash tables are adopted to look up metadata for the stored data to facilitate the processing of data. These mechanisms for looking up metadata require traversing search paths or going through multiple hops to look up metadata. However, there are many problems that need to be solved in looking up metadata through the above approach.

SUMMARY

Embodiments of the present disclosure provide a method, an electronic device, and a computer program product for looking up data.

According to a first aspect of the present disclosure, a method for looking up data is provided. This method includes: acquiring, at a first node, a data identifier for data to be looked up, wherein the first node is located in a system having a layered structure, and the data identifier comprises layer information related to a layer in the layered structure. The method further includes: determining a distance between the data identifier and a node identifier for the first node. The method further includes: determining, based on the distance, a second node that can be used to acquire metadata for the data for acquiring the metadata, wherein the distance is related to positions of the first node and the second node in the layered structure. The method further includes: determining, based on the metadata, a third node storing the data for acquiring the data.

According to a second aspect of the present disclosure, a method for processing data is provided. The method includes: determining, at a first node, a hash value of stored data, wherein the first node is located in a system having a layered structure. The method further includes: generating a data identifier for the data based on layer information for the first node and the hash value, wherein the layer information is related to a position of the first node in the layered structure. The method further includes: determining a distance between the data identifier and a node identifier for the first node. The method further includes: determining, based on the distance, a second node for storing metadata, wherein the metadata includes the data identifier, and the distance is related to positions of the second node for storing the metadata for the data and the first node in the layered structure.

According to a third aspect of the present disclosure, an electronic device is provided. The electronic device includes at least one processor; and a memory coupled to the at least one processor and having instructions stored thereon, wherein the instructions, when executed by the at least one processor, cause the device to perform actions including: acquiring, at a first node, a data identifier for data to be looked up, wherein the first node is located in a system having a layered structure, and the data identifier comprises layer information related to a layer in the layered structure; determining a distance between the data identifier and a node identifier for the first node; determining, based on the distance, a second node that can be used to acquire metadata for the data for acquiring the metadata, wherein the distance is related to positions of the first node and the second node in the layered structure; and determining, based on the metadata, a third node storing the data for acquiring the data.

According to a fourth aspect of the present disclosure, an electronic device is provided. The electronic device includes at least one processor; and a memory coupled to the at least one processor and having instructions stored thereon, wherein the instructions, when executed by the at least one processor, cause the device to perform actions including: determining, at a first node, a hash value of stored data, wherein the first node is located in a system having a layered structure; generating a data identifier for the data based on layer information for the first node and the hash value, wherein the layer information is related to a position of the first node in the layered structure; determining a distance between the data identifier and a node identifier for the first node; and determining, based on the distance, a second node for storing metadata, wherein the metadata includes the data identifier, and the distance is related to positions of the second node for storing the metadata for the data and the first node in the layered structure.

According to a fifth aspect of the present disclosure, a computer program product is provided, which is tangibly stored on a non-transitory computer-readable medium and includes machine-executable instructions, wherein the machine-executable instructions, when executed by a machine, cause the machine to perform the steps of the method in the first or second aspect of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

In the figures, identical or corresponding numerals represent identical or corresponding parts.

DETAILED DESCRIPTION

Example embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As mentioned above, nodes in a distributed storage system based on edge storage are generally organized in a decentralized manner. When a client requests to access data, it is first necessary to find metadata for the data from a distributed hash table of the distributed storage system to locate the data. However, the request for searching for the metadata will be forwarded multiple times among decentralized global nodes to obtain the metadata indicating the storage position of the application data.

Distributed hash tables are not perfect in edge scenarios. In conventional solutions, metadata for data generated by a particular source node would be broadcast to a decentralized machine and stored in a plurality of target nodes having node identifiers logically adjacent to the data identifier in the metadata. However, these target nodes may be physically distant from the source node that generated the data, or even distant from the region where the source node is located. In this case, a search for data or data blocks usually takes several hops because the metadata is stored in a target node distant from the region where the source node is located. In each hop, a node that is physically distant and has a high response latency may be queried if the node holds the data. As a result, this makes data searching take a long time. In some cases, such as self-driving vehicles, application data will be requested or shared within the same region to ensure continuity of service. The original distributed hash table mechanism distributes metadata throughout the system, which prolongs the search time when the trace route traverses expansive fields.

In order to solve the above and other potential problems, an embodiment of the present disclosure provides a method for looking up data. In this method, a first node acquires a data identifier for data to be looked up, wherein the first node is located in a system having a layered structure, and the data identifier comprises layer information related to a layer in the layered structure. Then, the first node determines a distance between the data identifier and a node identifier for the first node. The first node determines, based on the distance, a second node storing metadata for the data for acquiring the metadata, wherein the distance is related to positions of the first node and the second node in the layered structure. Finally, the first node determines, based on the metadata, a third node storing the data for acquiring the data. The method enables a quick lookup of a node where metadata for data is stored, thus saving the lookup time and improving the efficiency of data processing.

Figure 1:
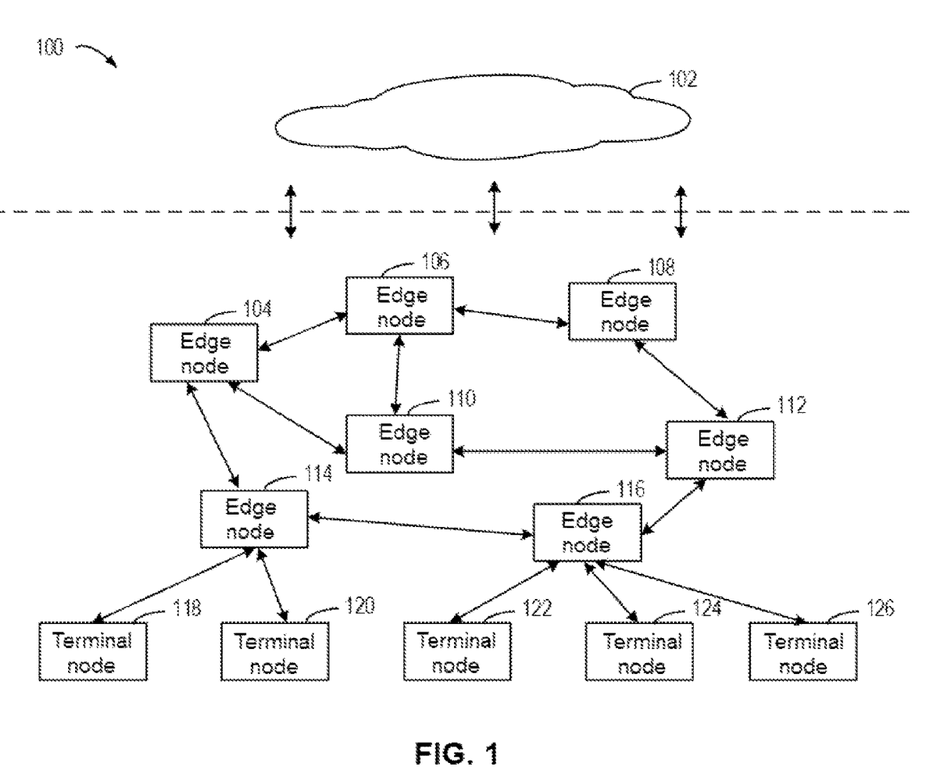
FIG. 1 illustrates a schematic diagram of a distributed storage system according to an embodiment of the present disclosure.

Embodiments of the present disclosure will be described in detail below further in connection with the accompanying drawings, where FIG. 1 illustrates a schematic diagram of distributed storage system 100 for data storage according to some embodiments of the present disclosure. It should be understood that the number and arrangement of devices illustrated in FIG. 1 are merely examples, and a different number and a different arrangement of devices may be included in distributed storage system 100.

As shown in FIG. 1, distributed storage system 100 in an edge computing environment includes cloud 102, edge nodes 104, 106, 108, 110, 112, 114, and 116, and terminal nodes 118, 120, 122, 124, and 126.

Cloud 102 may be a plurality of server device clusters that are provided by cloud service providers and integrated by software and hardware computing, which provide services as a whole. It should be understood that the number and arrangement of clouds shown in FIG. 1 are merely examples and not a specific limitation to the present disclosure. In distributed storage system 100, any number, any type, and any arrangement of clouds may be included.

Edge nodes 104, 106, 108, 110, 112, 114, and 116 join distributed storage system 100 through wired or wireless connections to be communicatively coupled with each other. In the present disclosure, an edge node may be any computing device with computing resources or any storage device with storage resources. The edge nodes have common capabilities such as real-time data analysis, local data storage, and real-time network connectivity. Examples of edge nodes include, but are not limited to, edge gateways, edge controllers, or edge servers.

Terminal nodes 118, 120, 122, 124, and 126 typically include various types of terminal devices. Examples of terminal devices include, but are not limited to: desktop computers, laptop computers, smart phones, wearable devices, security cameras, smart manufacturing devices, smart home devices, Internet of Things (IoT) devices, smart cars, and the like. It should be understood that although only five terminal nodes are shown in FIG. 1, this is merely an example and not a specific limitation to the present disclosure. In distributed storage system 100, any number and any type of terminal nodes may be included.

Terminal nodes 118, 120, 122, 124, and 126 may join distributed storage system 100 via wired or wireless connections according to their geographic locations, network configuration, etc., so as to be communicatively coupled with each other. For example, terminal nodes 118 and 120 are connected to the physically closest edge node 114, and terminal nodes 122, 124, and 126 are connected to the physically closest edge node 116.

The terminal nodes and edge nodes in distributed storage system 100 store data and metadata for the data and are capable of establishing a communication path to a requesting node to transmit the requested data. The metadata may include at least an identifier for the data, a storage position for the data, a size of the data, a source of the data, etc.

In some embodiments, the metadata for the data may be generated when the data is stored at the terminal nodes or the edge nodes. The data identifier in the metadata includes a hash value of the data obtained by hashing the data with a hash algorithm. For example, the length of the hash value may be 256, 128, etc. After the hash value of the data is obtained, it is combined with layer information related to a node where the data is stored to obtain the data identifier. The layer information, also referred to as a geographic identifier, reflects information about the position of the node in the hierarchy structure, that is, it indicates in which region of the hierarchy structure the node is located. A target node identifier that is logically close to this data identifier is then looked up for storing the metadata using a target node that corresponds to this target node identifier.

In some embodiments, the layer information is attached as a prefix to the hash value of the data. The above examples are intended to describe the present disclosure only and are not specific limitations to the present disclosure. Any suitable combination of the layer information and the hash value of the data may be adopted. Since the layer information for the node that stores the data is added to the data identifier, the node identifier for the node used to store the metadata is logically adjacent to the data identifier. At this point, the node storing the metadata and the node storing the data are typically located in the same region indicated by the layer information. Further, a plurality of nodes logically adjacent to the data identifier may be set to store the metadata. Thus, in the lookup of the metadata, the node storing the metadata can be quickly located by using the distance between the data identifier and the node identifier.

In some embodiments, the node identifier is also referred to as a node identifier based on layer information. The position of the node or the layer information may be added as a prefix to the hash value of the node to obtain the node identifier for the node. The hash value of the node may be obtained by performing a hash operation on the attribute information for the node, for example, the node ID, the node name, the node IP address, etc. Alternatively or additionally, the node identifier and the data identifier are of the same length.

The method enables a quick lookup of the node where metadata for data is stored, thus saving the lookup time and improving the efficiency of data processing.

The foregoing has described, with reference to FIG. 1, a schematic diagram of example distributed storage system 100 in which embodiments of the present disclosure can be implemented. The following will describe, with reference to FIG. 2, a flow chart of method 200 for looking up data according to an embodiment of the present disclosure. Method 200 may be executed at terminal nodes 118, 120, 122, 124, and 126, and edge nodes 104, 106, 108, 110, 112, 114, and 116 in FIG. 1, or at any suitable computing device.

Figure 2:
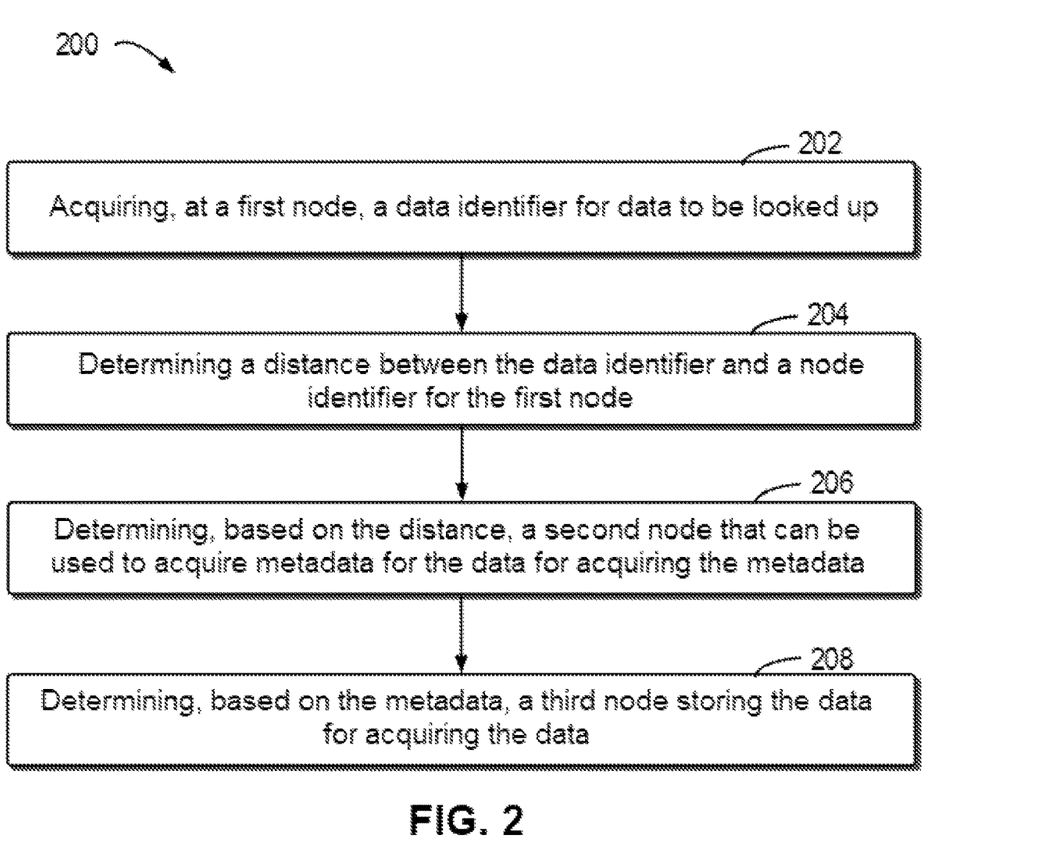
FIG. 2 illustrates a flow chart of a method for looking up data according to an embodiment of the present disclosure.

At block 202, a data identifier for data to be looked up is acquired at a first node, wherein the first node is located in a system having a layered structure, and the data identifier includes layer information related to a layer in the layered structure. For example, terminal node 120 receives a data lookup request from a user, where the request includes the data identifier for data.

In some embodiments, the node receives a keyword, such as a file name, from the user, and then obtains the corresponding data identifier from a mapping relationship between keywords and data identifiers, using that keyword for searching the mapping relationship to find the data identifier. In an example, the mapping relationship is a mapping relationship or correspondence between file names and data identifiers. The above example allows for a quick determination of the data identifier. In some embodiments, the node receives the data identifier sent by other nodes. The above examples are intended to describe the present disclosure only and are not specific limitations to the present disclosure. A person skilled in the art may use any suitable means to acquire the data identifier.

At block 204, a distance between the data identifier and a node identifier for the first node is determined. For example, terminal node 120 determines the distance between the obtained data identifier and the node identifier for terminal node 120.

In some embodiments, the node identifier includes layer information related to the position of the first node in the layered structure, where the layer information for the first node relates to the position of the first node in the layered structure. For example, the node identifier for terminal node 120 includes the layer information related to terminal node 120, where the layer information may indicate a layer region in which edge node 114 connected to terminal node 120 is located. Reference may be made to the description of FIG. 5 below for an example setting of the layer information.

In some embodiments, the first node converts the data identifier and the node identifier to binary values. Then, XOR processing is performed on the data identifier and the node identifier as converted to determine the distance. In this way, the distance between the two can be quickly determined.

In some embodiments, the node hashes the data when storing it to obtain a hash value, then combines the layer information for that node into the hash value to obtain the data identifier for that data, and then stores the data on a node corresponding to a node identifier that is logically adjacent to that node identifier. Since both the node identifier and the data identifier include layer information for the node in the hierarchy structure, the node where the metadata is stored can be quickly found by comparing the data identifier and the node identifier.

In some embodiments, after receiving the data identifier, the first node first looks up whether or not there exists corresponding metadata in the first node, and if not, then calculates the distance between the data identifier and the node identifier.

At block 206, based on the distance, a second node that can be used to acquire metadata for the data is determined for acquiring the metadata, where the distance is related to positions of the first node and the second node in the layered structure. For example, if the second node is found based on the distance to be terminal node 118, the metadata may be acquired from terminal node 118. If, based on the distance, the second node is found to be edge node 116, the metadata is acquired from edge node 116.

In some embodiments, a routing table may be stored in each node of the distributed storage system, where the routing table includes a plurality of entries, each entry including a range of distances from the node identifier for the node and nodes which are within that range of distances.

When the routing table is generated, the distances between the node identifier for the node and node identifiers for other nodes communicating with that node are calculated, and then the node identifiers are placed into entries corresponding to the range of distances based on the distances. In some embodiments, the first node determines a set of nodes corresponding to the distance based on a mapping relationship between distance intervals and node identifiers, for example, a set of nodes corresponding to a distance interval in the routing table in which the distance is located or a plurality of sets of nodes corresponding to a distance interval that includes the distance and a plurality of adjacent distance intervals in the routing table. A node in the set or plurality of sets of nodes is then determined as the second node. The data identifier is then sent to the second node for receiving the metadata from the second node. After receiving the data identifier, the second node looks up whether or not there exists the corresponding metadata, if yes, it returns the metadata to the first node; and if not, it performs the same operation as the first node to look up the node storing the metadata from its routing table, and then sends the data identifier to one of the nodes therein.

At block 208, based on the metadata, a third node storing the data is determined for acquiring the data. After the metadata is obtained, the identifier or position of the third node storing the data may be determined. The data may then be obtained by sending a data acquisition request to the third node. In this way, the data may be obtained quickly.

The method enables a quick lookup of a node where metadata for data is stored, thus saving the lookup time and improving the efficiency of data processing.

The foregoing has described, with reference to FIG. 2, a flow chart of method 200 for processing data according to an embodiment of the present disclosure. The following will describe, with reference to FIG. 3, a flow chart of method 300 for processing data according to an embodiment of the present disclosure. Method 300 may be executed at terminal nodes 118, 120, 122, 124, and 126, and edge nodes 104, 106, 108, 110, 112, 114, and 116 in FIG. 1, and at any suitable computing device. Method 300 primarily describes the process of storing data and metadata.

Figure 3:
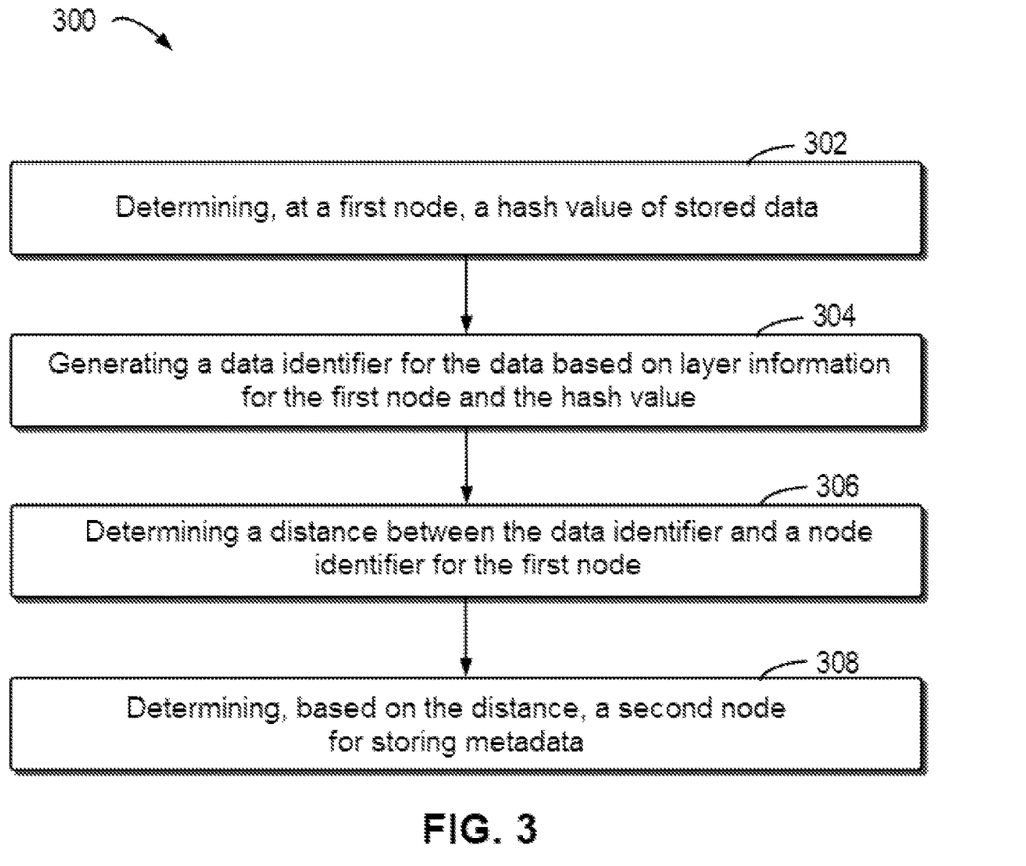
FIG. 3 illustrates a flow chart of a method for processing data according to an embodiment of the present disclosure.

At block 302, a hash value of stored data is determined at a first node, where the first node is located in a distributed storage system having a layered structure. For example, the data to be stored is obtained or generated at terminal node 120. The hash value of that data is then obtained based on a hash function. The hash function may be any suitable hash function. In an example, the size of the hash value for the data is 256 or 128 bits. The above example is intended to describe the present disclosure only and is not a specific limitation to the present disclosure. The hash value of the data may be set to any suitable size.

At block 304, a data identifier for the data is generated based on layer information for the first node and the hash value, where the layer information for the first node is related to a position of the first node in the layered structure.

In some embodiments, the layer information for the first node for storing the data is acquired. For example, if terminal node 120 in FIG. 1 stores data, the layer information for terminal node 120 is obtained. This layer information indicates the layer region in which terminal node 120 is located. Then, the layer information is attached as a prefix to the hash value to form the data identifier. In this manner, the node that stores the metadata for the data can be quickly determined. The above example is only for describing the present disclosure and is not a specific limitation to the present disclosure, and a person skilled in the art may set up the way of combination for the layer information and the data identifier as needed.

At block 306, a distance between the data identifier and a node identifier for the first node is determined. This distance is calculated for looking up the node identifier for a node storing the metadata for the data.

In some embodiments, the first node converts the data identifier and the node identifier to binary values. Then, an XOR operation is performed on the data identifier and the node identifier as converted to determine the distance. In some embodiments, various suitable operations may be performed on the data identifier and the node identifier for the first node, and the results of the operations may be used as the corresponding distance. The above examples are intended to describe the present disclosure only and are not specific limitations to the present disclosure. At block 308, based on the distance, a second node is determined for storing metadata, wherein the metadata comprises the data identifier, and the distance is related to positions of the second node for storing the metadata for the data and the first node in the layered structure.

In some embodiments, the first node determines a set of nodes corresponding to the distance according to a mapping relationship between distance intervals and node identifiers. The first node then determines the second node for storing the metadata from the set of nodes. For example, one of the nodes in the set of nodes corresponding to the distance interval in which the distance is located in the routing table of the first node is used as the second node. The above examples are intended to describe the present disclosure only and are not specific limitations to the present disclosure.

The method enables a quick lookup of the node where metadata for data is stored, thus saving the lookup time and improving the efficiency of data processing.

The foregoing has described, with reference to FIG. 3, a flow chart of method 300 for processing data according to an embodiment of the present disclosure. The following will describe, with reference to FIG. 4, example 400 of the hierarchy structure of devices according to an embodiment of the present disclosure.

Figure 4:
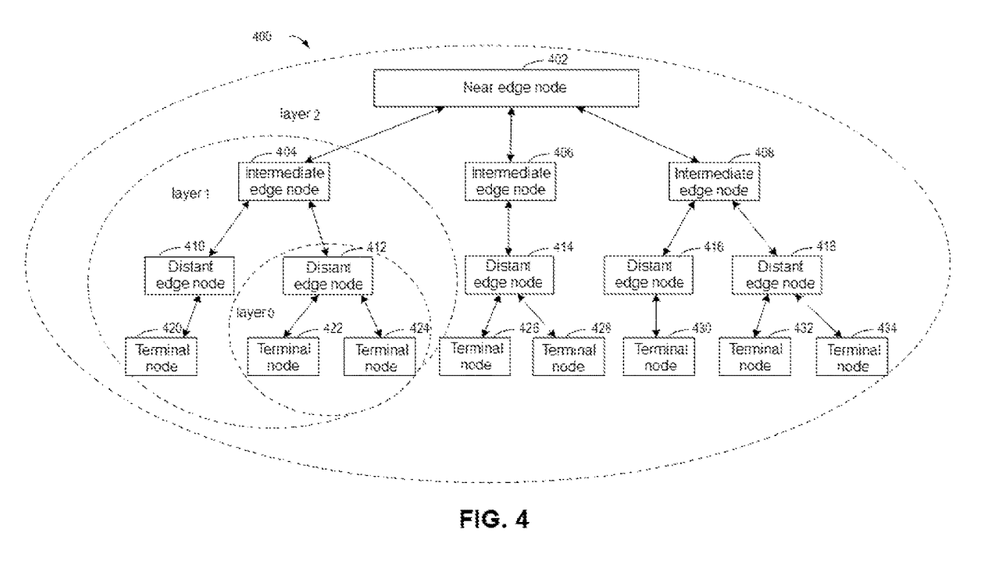
FIG. 4 illustrates a schematic diagram of an example of a hierarchy structure of devices according to an embodiment of the present disclosure.

As shown in FIG. 4, example 400 includes a hierarchy structure formed by various nodes of the system. Terminal nodes 420, 422, 424, 426, 428, 430, 432, and 434 form a layer, and edge nodes 402, 404, 406, 408, 410, 412, 414, 416, and 418 form three layers. Thus, the lookup region for terminal node 422 is divided into three layers. When searching for metadata data, a traversal will first be performed in the layer 0 region with the lowest node latency, then expanded to the layer 1 region, and then to the layer 2 region, for the purpose of a wider range search.

When a node connects to a gateway or other devices and joins an edge data service network, it will be assigned with layer information, also known as a geographic identifier or geographic ID. Since the gateway is statically placed indoors and well-maintained, it is pre-configured with an appropriate geographic identifier that may be broadcast to nearby nodes.

In this multi-layer region design, the layer information in each node comprises multiple parts, and the layer information may be represented in binary form. The multiple parts indicate their locations in the hierarchy structure, where each part indicates the layer region in which it is located. For example, as shown in FIG. 4, there are three layers above the terminal nodes, and since there is only one region at layer 2, there is no need to set additional bits for that region.

Therefore, layer information may be set up to indicate two layers, with the first part of the binary data 00 . . . 0 in the layer information being used to indicate the layer 1 region and the latter part of the binary data 00 . . . 0 in the layer information being used to indicate the layer 0 region. The number of bits per layer is variable depending on the scale of the entire edge network. The above examples are intended to describe the present disclosure only and are not specific limitations to the present disclosure. The number of bits for the geographic identifier, how many bits indicate a layer, or how many layers the geographic identifier indicates may be set up by a person skilled in the art as needed.

Figure 5:
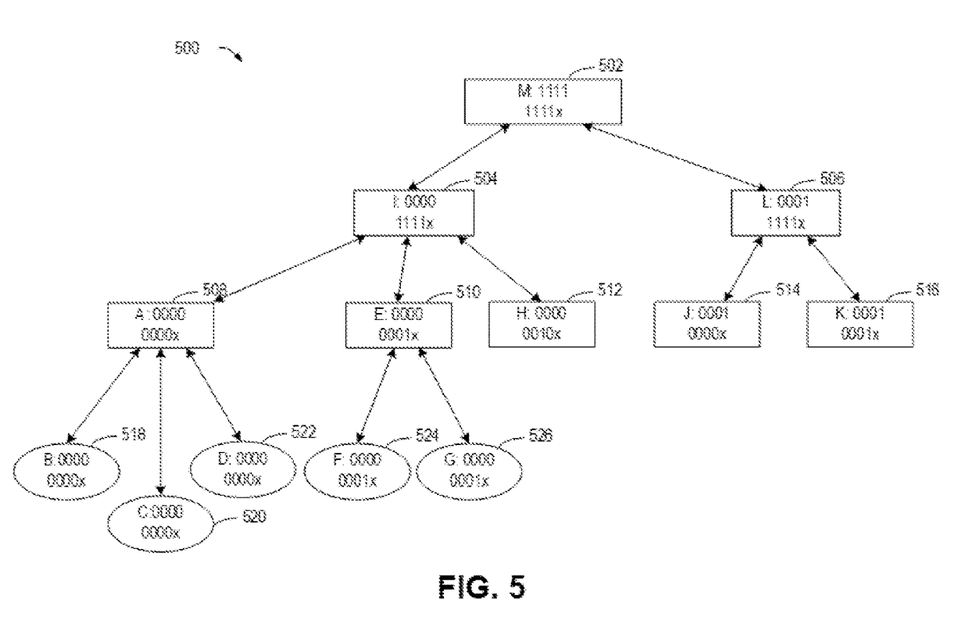
FIG. 5 illustrates a schematic diagram of an example of a hierarchy structure of devices according to an embodiment of the present disclosure.

The foregoing has described, with reference to FIG. 4, a schematic diagram of example 400 of the hierarchy structure of devices according to an embodiment. The following will describe, with reference to FIG. 5, a schematic diagram of example 500 of the hierarchy structure of devices according to an embodiment of the present disclosure, where geographic identifiers are assigned to nodes 502, 504, 506, 508, 510, 512, 514, 516, 518, 520, 522, 524, and 526 in example 500. As shown in FIG. 5, each node has a node identifier that includes layer information. For example, the node identifier=the layer information+the hash value for the node, where the hash value is denoted by "x" and the layer information occupies 8 bits, 4 bits for layer 1 and 4 bits for layer 0. The layer information for node A 508 is 0000 0000, which indicates that it is in the layer region of 0000 in layer 1. The layer information for layer 0 is 0000, which indicates that it is in the layer region of 0000 in layer 0. The layer information 1111 in each layer region is reserved for nodes with the lowest depth in that layer, e.g., nodes I and M in FIG. 5, which are control points in respective layers with more powerful hardware.

Figure 6:
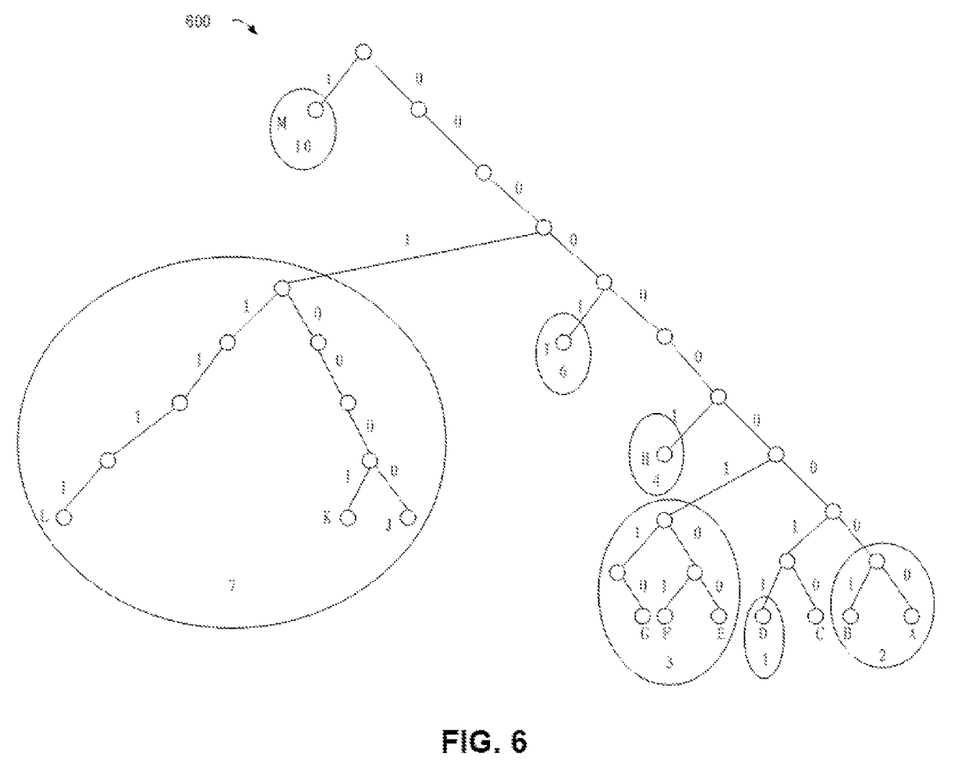
FIG. 6 illustrates a schematic diagram of an example of a binary tree structure for devices according to an embodiment of the present disclosure.

In some embodiments, layer information may be applied to the generation of a routing table. Assuming that when "x" is a two-bit hash ID, example 600 of a binary tree constructed using node identifiers including layer information is shown in FIG. 6, which is used to illustrate the distances of node C from other nodes. In constructing the binary tree, the leaves of the tree are IDs of the nodes. In this binary tree, the left children are assigned with bits 0 and the right children are assigned with 1. For any given node, the binary tree may be divided into a series of successively lower subtrees that do not contain that node. The highest subtree comprises the half of the binary tree that does not contain that node. The next subtree comprises the remaining half of the tree that does not contain that node, and so on. Taking node C as an example, each elliptic region is a subtree identified with a number, for example, 1 to 10, to indicate the distance from node C. For example, the number is used as an exponent of 2 to indicate the distance from node C.

The routing table formed in node C by the node distances shown in FIG. 6 is as follows:

TABLE 1

| Routing table for node C | |
| --- | --- |
| Distance | Node |
| $[2^0, 2^1)$ | D |
| $[2^1, 2^2)$ | A, B |
| $[2^2, 2^3)$ | E, F, G |
| $[2^3, 2^4)$ | H |
| $[2^4, 2^5)$ | |

TABLE 1-continued

| Routing table for node C | |
| --- | --- |
| Distance | Node |
| $[2^5, 2^6)$ | I |
| $[2^6, 2^7)$ | J, K, L |
| $[2^7, 2^8)$ | |
| $[2^8, 2^9)$ | |
| $[2^9, 2^{10})$ | M |

Nodes that are located in the layer 0 region together with node C are in the first two rows, nodes that are located in the layer 1 region together with node C are in the middle of the table, and nodes that are located in the layer 2 region together with node C are placed at the bottom of the routing table. Nodes I and M are the control points for each respective layer and occupy an entire row. Following the distributed hash table lookup mechanism, after the distances from the data identifier to the node identifiers are calculated, their distances fall into the corresponding rows. If the data region is far away, the nodes in the next hop are nodes E, F, G, H, and I in Table 1, otherwise the nodes in the next hop are other nodes that are farther away. This process brings the search to near the position of the metadata, and the next lookup will be similar to the previous one.

For example, referring to FIG. 5, node C is searching for metadata in node E. If due to the dynamic attributes of the edge, node C does not know about node E, but it records some other nodes in the same region, node C then hops first to a row in a region farther away in the routing table, such as node F. The second hop is calculated in F, which is the "data in the same region" case described above. F will quickly find node E in the same region. This process does not hop among globally scattered nodes, but approaches the target directly with minimum latency.

The method enables a quick lookup of the node where metadata for data is stored, thus saving the lookup time and improving the efficiency of data processing.

Figure 7:
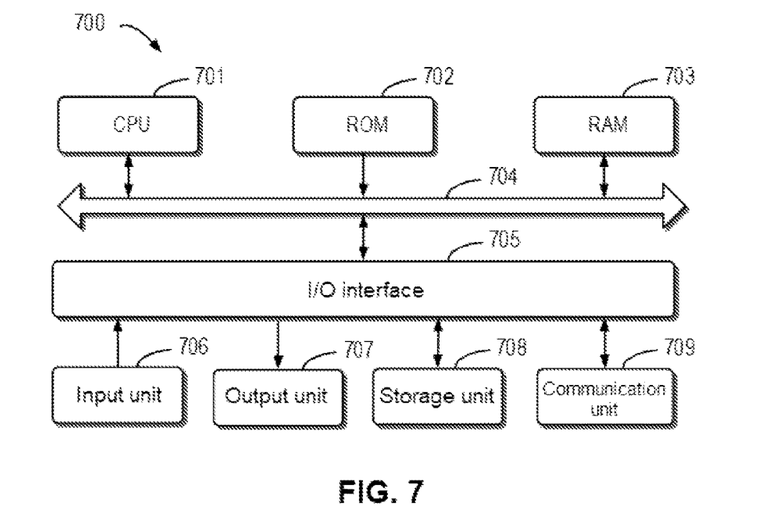
FIG. 7 illustrates a block diagram of an example device suitable for implementing embodiments of the present disclosure.

FIG. 7 shows a block diagram of example device 700 that can be used to implement embodiments of the present disclosure. Edge nodes 104, 106, 108, 110, 112, 114, and 116 and terminal nodes 118, 120, 122, 124, and 126 in FIG. 1 may be implemented using device 700. As shown in the figure, device 700 includes central processing unit (CPU) 701 that may perform various appropriate actions and processing according to computer program instructions stored in read-only memory (ROM) 702 or computer program instructions loaded from storage unit 708 to random access memory (RAM) 703. Various programs and data required for the operation of device 700 may also be stored in RAM 703. CPU 701, ROM 702, and RAM 703 are connected to one another through bus 704. Input/output (I/O) interface 705 is also connected to bus 704. A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various processes and processing described above, such as methods 200 and 300, may be performed by CPU 701. For example, in some embodiments, methods 200 and 300 may be implemented as a computer software program that is tangibly included in a machine-readable medium such as storage unit 708. In some embodiments, part or all of the computer program may be loaded and/or installed onto device 700 via ROM 702 and/or communication unit 709. When the computer program is loaded into RAM 703 and executed by CPU 701, one or more actions of methods 200 and 300 described above can be implemented.

Example embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Example embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments or technical improvements to technologies on the market, so as to enable persons of ordinary skill in the art to understand the embodiments disclosed herein.

What is claimed is:

1. A method for looking up data, comprising:
    acquiring, at a first node, a data identifier for data to be looked up, wherein the first node is located in a system having a layered structure, and the data identifier comprises layer information related to a layer in the layered structure;
    determining a distance between the data identifier and a node identifier for the first node;
    determining, based on the distance, a second node that can be used to acquire metadata for the data for acquiring the metadata, wherein the distance is related to positions of the first node and the second node in the layered structure; and
    determining, based on the metadata, a third node storing the data for acquiring the data;
    wherein determining the distance comprises:
        converting the data identifier and the node identifier to binary values; and
        performing XOR processing on the data identifier and the node identifier as converted to determine the distance.

2. The method according to claim 1, wherein acquiring the data identifier comprises:
    obtaining a data identifier corresponding to the data based on a keyword for the data.

3. The method according to claim 1, wherein determining the second node comprises:
    determining a set of nodes corresponding to the distance based on a mapping relationship between distance intervals and node identifiers; and
    identifying one of the set of nodes as the second node.

4. The method according to claim 3, wherein determining the second node further comprises:
    sending the data identifier to the second node for receiving the metadata from the second node.

5. The method according to claim 1, wherein the node identifier comprises layer information related to a position of the first node in the layered structure.

6. A computer program product tangibly stored on a non-transitory computer-readable medium and comprising machine-executable instructions, wherein the machine-executable instructions, when executed by a machine, cause the machine to perform steps of the method of claim 1.

7. A method for processing data, comprising:
    determining, at a first node, a hash value of stored data, wherein the first node is located in a system having a layered structure;
    generating a data identifier for the data based on layer information for the first node and the hash value, wherein the layer information is related to a position of the first node in the layered structure;
    determining a distance between the data identifier and a node identifier for the first node; and
    determining, based on the distance, a second node for storing metadata, wherein the metadata comprises the data identifier, and the distance is related to positions of the second node for storing the metadata for the data and the first node in the layered structure;
    wherein determining the distance comprises:
        converting the data identifier and the node identifier to binary values; and
        performing an XOR operation on the data identifier and the node identifier as converted to determine the distance.

8. The method according to claim 7, wherein generating the data identifier comprises:
    attaching the layer information as a prefix to the hash value to form the data identifier.

9. The method according to claim 7, wherein determining the second node comprises:
    determining a set of nodes corresponding to the distance according to a mapping relationship between distance intervals and node identifiers; and
    determining the second node for storing the metadata from the set of nodes.

10. An electronic device, comprising:
    at least one processor; and
    a memory coupled to the at least one processor and having instructions stored thereon, wherein the instructions, when executed by the at least one processor, cause the device to perform the method of claim 7.

11. A computer program product tangibly stored on a non-transitory computer-readable medium and comprising machine-executable instructions, wherein the machine-executable instructions, when executed by a machine, cause the machine to perform steps of the method of claim 7.

12. An electronic device, comprising:
    at least one processor; and
    a memory coupled to the at least one processor and having instructions stored thereon, wherein the instructions, when executed by the at least one processor, cause the device to perform actions comprising:
    acquiring, at a first node, a data identifier for data to be looked up, wherein the first node is located in a system having a layered structure, and the data identifier comprises layer information related to a layer in the layered structure;
    determining a distance between the data identifier and a node identifier for the first node;
    determining, based on the distance, a second node that can be used to acquire metadata for the data for acquiring the metadata, wherein the distance is related to positions of the first node and the second node in the layered structure; and
    determining, based on the metadata, a third node storing the data for acquiring the data;
    wherein determining the distance comprises:
        converting the data identifier and the node identifier to binary values; and
        performing XOR processing on the data identifier and the node identifier as converted to determine the distance.

13. The electronic device according to claim 12, wherein acquiring the data identifier comprises:
    obtaining a data identifier corresponding to the data based on a keyword for the data.

14. The electronic device according to claim 12, wherein determining the second node comprises:
- determining a set of nodes corresponding to the distance based on a mapping relationship between distance intervals and node identifiers; and
- identifying one of the set of nodes as the second node.

15. The electronic device according to claim 14, wherein determining the second node further comprises:
- sending the data identifier to the second node for receiving the metadata from the second node.

16. The electronic device according to claim 12, wherein the node identifier comprises layer information related to a position of the first node in the layered structure.

* * * * *